Nov. 19, 1957  K. A. HÄUSSERMANN  2,813,607
FRICTION CLUTCH WITH SPRING DISC OF THE BELLEVILLE TYPE
Filed Jan. 18, 1954
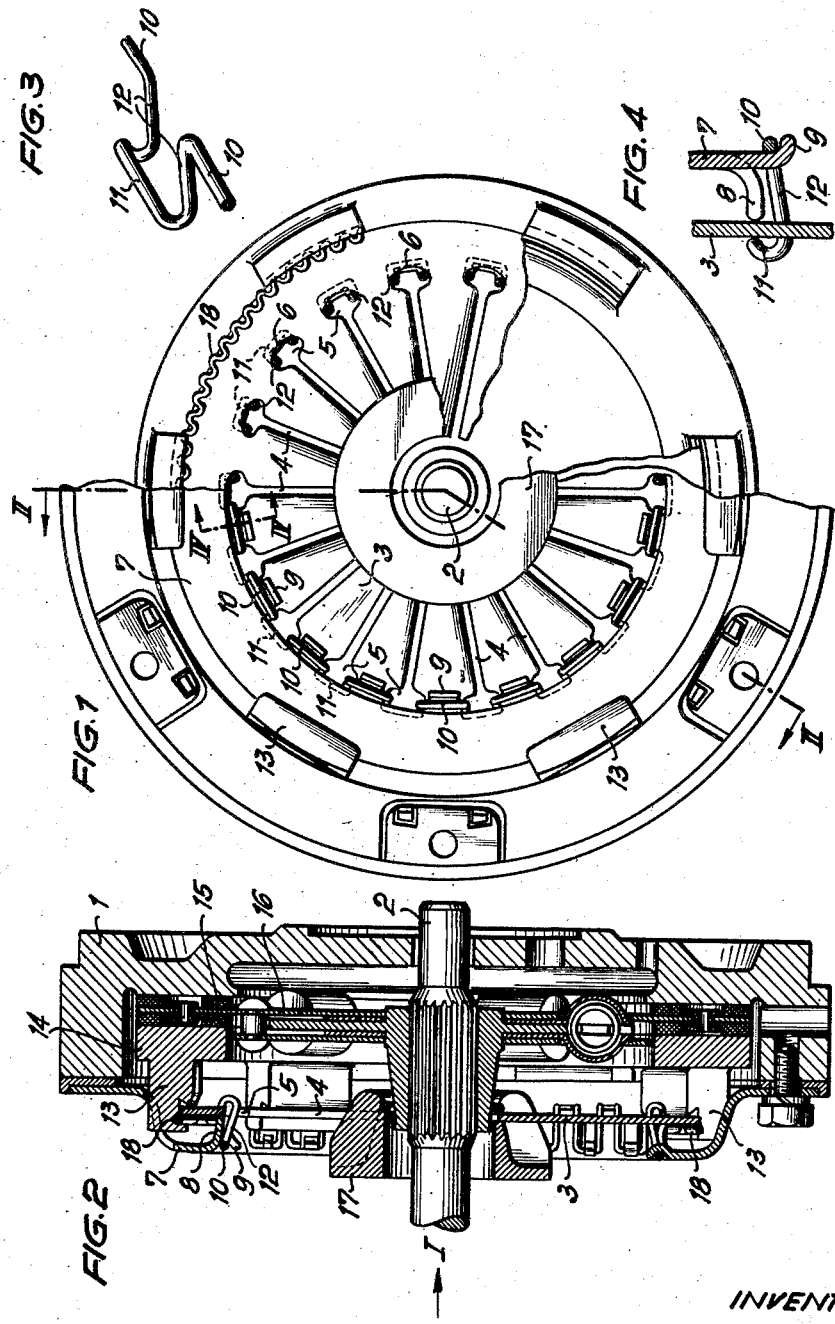
INVENTOR
Kurt A. Häussermann
By
Patent Agent

United States Patent Office 2,813,607
Patented Nov. 19, 1957

2,813,607

FRICTION CLUTCH WITH SPRING DISC OF THE BELLEVILLE TYPE

Kurt A. Häussermann, Stuttgart, Germany, assignor to Lamellen- und Kupplungsbau August Häussermann, Stuttgart-Oberturkheim, Germany Application January 18, 1954, Serial No. 404,496

Claims priority, application Germany November 8, 1953

4 Claims. (Cl. 192—68)

Friction clutches are known, especially for motor vehicles, according to which a clutch spring is employed which consists of an annular spring disc provided with resilient tongues or sections separated from each other by radial slots, and according to which said clutch spring when its inner marginal area is subjected to pressure causes its outer marginal area to be lifted off from the pressure plate of the clutch to thereby bring about a disengagement of the clutch. To this end, the spring disc is within its outer circumference clamped in between supporting means which form abutment means with this resilient movement of the clutch spring.

With some of the heretofore known clutches of this type, the spring disc rests upon individual points through the intervention of bolts and similar connecting means. With other heretofore known clutches of the type referred to above, special holding means in the form of studs, tongues or the like and circular abutment means in form of wire rings surrounding said holding means are provided which wire rings form the pivot bearings or anti-friction bearings for the lever movement of the individual sectors of the spring disc.

The above mentioned two arrangements require a relatively great number of parts and therefore are expensive. Also the assembly of these known arrangements is frequently causing certain difficulties.

It is, therefore, an object of this invention to provide a friction clutch with spring disc which will overcome the above mentioned drawbacks.

It is another object of this invention to provide a friction clutch with spring disc of the above mentioned type which will do away with a continuous annular support for the spring disc and with the employment of multi-part holding members and similar devices.

It is another object of this invention to provide a friction clutch with spring disc of the type set forth in the preceding paragraphs which will be simple in construction and reliable in operation.

The invention is illustrated by way of example in the accompanying drawing in which:

Fig. 1 represents a front view of the clutch seen in the direction of the arrow A of Fig. 2, a portion of the clutch casing and spring disc being omitted.

Fig. 2 is a section taken along the line II—II of Fig. 1.

Fig. 3 illustrates in perspective and on a somewhat larger scale a portion of the wire to be used in connection with the clutch of the present invention.

Fig. 4 is a section taken along the line IV—IV of Fig. 1 but on a scale larger than that of Fig. 1.

General arrangement

The primary feature of the clutch according to the present invention consists primarily in that the abutment for the spring disc is formed on one hand by the inwardly edged or beaded marginal area of the lid for the clutch casing and on the other hand by spring wire loops which are suspended on said lid and extend through recesses in the spring disc and partially catch underneath the same. The wire loops may be suspended either individually on the said lid or they may be formed by windings of a continuous serpentine-shaped wire which windings are bent inwardly and outwardly and are passed through bores provided in a manner known per se at the end of the radial slots, in such a manner that they extend from the inside through the outer rim of said recesses. In order that sufficient space will be available for passing through the legs of the wire windings which are approximately parallel to the axis of the clutch and in order to have sufficient space for the formation of the abutments for the spring disc, the bores or apertures of the spring disc are preferably not arranged along a circle or a square but extend longitudinally in the circumferential direction. The danger of tearing may be eliminated for all practical purposes by rounding off the outer rims of said recesses by employing a correspondingly greater radius of curvature.

Structural arrangement

Referring now to the drawing in detail, the arrangement shown therein is provided with a fly-wheel 1 which in a manner known per se is connected with the motor shaft (not shown in the drawing) which latter is to be coupled to a shaft 2 for instance the transmission shaft of a motor vehicle transmission. The clutch is provided with a spring disc 3 having radial slots 4 ending in apertures or recesses 5. The apertures 5 have their longitudinal direction extending in the circumferential direction. The outer edges 6 of the apertures 5 are rounded according to an arc with as great a diameter of curvature as possible.

The lid 7 for the clutch is provided with an inwardly flanged marginal area 8 which may either in a continuous way or by means of individual arched portions separated by receding portions, form the outer abutment for the disc 3.

An undulated wire ring is by means of its outer windings 10 suspended in tongues 9 which are cut out of the marginal portion of the lid and bent outwardly. The inner windings 11 of said wire ring are by means of the approximately axially extending legs 12 passed inwardly through the apertures 5 and catch underneath the edges of the apertures 5 so that they will act as abutments for the spring disc.

The outer marginal area of the spring disc rests on individual protruding portions 13 of the pressure plate 14 which latter in a manner known per se may be brought into operative engagement with the disc 16 through conventional friction facings.

The spring disc 3 is inserted under load and with slightly conical distortion into the casing which may for instance be of one piece with the fly-wheel 1. If this spring disc 3 is then pressed in by means of the pressure ring 17, its outer marginal area is lifted off from its support on the pressure plate 14 and rests against an undulated wire ring 18 through the intervention of which also the pressure plate is lifted off from the friction facing so that the clutch is disengaged. The outer edge 6 of the apertures 5 of the spring disc where during the actuation of the spring disc the greatest stresses occur may be strengthened in a manner known per se by providing the same with circular bulging areas for instance by stamping.

It is, of course, understood that the present invention is, by no means, limited to the particular construction shown in the drawing but also comprises any modifications within the scope of the appended claims.

What I claim is:

1. In combination in a friction clutch: a fly-wheel, an annular cover member having its outer marginal portion connected to said fly-wheel and having its inner marginal portion flanged inwardly in a direction toward said flywheel, a pressure plate arranged substantially co-axially with said fly-wheel for cooperation therewith, friction disc means interposed between said pressure plate and said fly-wheel and adapted to be pressed against said fly-wheel by said pressure plate, a Belleville type spring provided with apertures and engaging said pressure plate and being operable to actuate said pressure plate, one side of the marginal area of said spring being engaged by said inwardly flanged marginal portion of said annular cover member, and wire loops suspended on said annular cover member and engaging the other side of said spring while extending through said apertures in said spring, said inwardly flanged marginal portion of said cover member and said wire loops forming pivotal supporting means for said spring.

2. In combination in a friction clutch: a fly-wheel, an annular cover member having its outer marginal portion connected to said fly-wheel and having its inner marginal portion flanged inwardly in a direction toward said fly-wheel, a pressure plate arranged substantially co-axially with said fly-wheel for cooperation therewith, friction disc means interposed between said pressure plate and said fly-wheel and adapted to be pressed against said fly-wheel by said pressure plate, a Belleville type spring engaging said pressure plate and provided with cut-out portions and operable to actuate said pressure plate, one side of the marginal area of said Belleville type spring being engaged by said inwardly flanged marginal portion of said annular cover member, an undulated spring wire having individual winding sections bent inwardly and extend through said cut-out portions of said Belleville type spring and catching therebehind from the inside, said winding sections and said inwardly flanged inner marginal portion of said cover member forming bearing means for said spring, and a pressure exerting member arranged for engagement with the central portion of said Belleville type spring to exert pressure on the latter for actuation of said pressure plate.

3. In combination in a friction clutch: a fly-wheel, an annular cover member having its outer marginal portion connected to said fly-wheel and having its inner marginal portion flanged inwardly in a direction toward said fly-wheel, a pressure plate arranged for cooperation with said fly-wheel, friction disc means interposed between said pressure plate and said fly-wheel and adapted to be pressed against said fly-wheel by said pressure plate, a spring disc engaging said pressure plate and operable to actuate the same, said spring disc being provided with radial slots having their outer ends broadened into apertures wider than the width of said slots, one side of the marginal area of said spring disc being engaged by said inwardly flanged marginal portion of said cover member, said cover member having ears cut out and bent toward the outside of said cover member, wire portions suspended on said ears and extending through said apertures so as to catch behind the edges respectively defining said apertures, and a pressure exerting member arranged for engagement with the central portion of said spring disc to exert pressure on the latter for actuation of said pressure plate.

4. A clutch according to claim 3, in which the apertures at the outer ends of said radial slots have their longitudinal extension in the circumferential direction of said spring disc.

References Cited in the file of this patent
UNITED STATES PATENTS

| | | |
|---|---|---|
| 1,939,888 | Fink | Dec. 19, 1933 |
| 2,138,169 | Hunt | Nov. 29, 1938 |
| 2,256,708 | Geyer et al. | Sept. 23, 1941 |
| 2,256,714 | Hunt | Sept. 23, 1941 |
| 2,380,677 | Schjolin | July 31, 1945 |